July 21, 1953     L. V. WILSON     2,646,016

VEHICLE COLLISION INDICATOR

Filed May 24, 1951

INVENTOR.
LOYAL V. WILSON
BY
James S. Givnan
ATTY

Patented July 21, 1953

2,646,016

UNITED STATES PATENT OFFICE 2,646,016

VEHICLE COLLISION INDICATOR

Loyal Vern Wilson, Albany, Oreg.

Application May 24, 1951, Serial No. 228,047

1 Claim. (Cl. 116—32)

This invention relates to improvements in devices for indicating the exact location of vehicle collisions and the participants in the collision.

One of the principal objects of the invention is the provision of a container made of easily broken material such as thin molded glass or the like, filled with a colored liquid stain or paint and attached to a vehicle at various locations most susceptible to damage in a collision.

A further object is the inclusion of a reflector or a highly polished reflecting surface within each device to provide warning lights on the side of the vehicle which are especially useful in crossing street and road intersections.

A still further object is the provision of a device of this character which is of simple, efficient and inexpensive construction and durable enough to withstand ordinary vibrations of the vehicle, normal road shock, and the like, but at the same time readily breakable upon impact with another vehicle or any other obstruction. The colored stain or fluid will, of course, spill from the device when broken and will stain not only the street or roadway at the exact location of the collision but will also stain the other vehicle involved in the collision.

These and other objects will appear as my invention is more fully hereinafter described in the following specification, illustrated in the accompanying drawing and finally pointed out in the appended claim.

Figure 1:
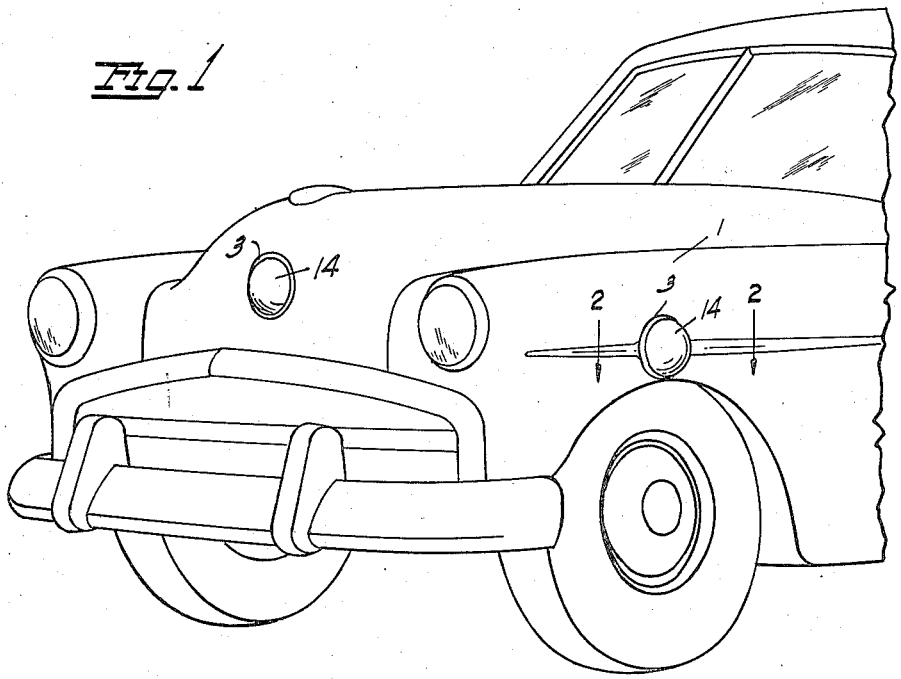
Figure 1 is a fragmentary perspective view of a vehicle showing my invention applied to the forward end and to one side thereof.

Referring now more particularly to the drawing.

Figure 2:
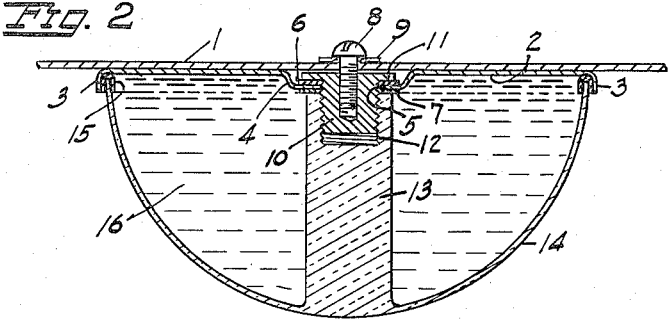
Figure 2 is an enlarged sectional plan view taken approximately along the line 2—2 of Figure 1.

In Figure 2 reference numeral 1 indicates a fragment of a vehicle body such for instance as one of the fenders, the front end of the hood, or any other portion of the vehicle body to which the device is attached.

The invention comprises a base in the form of a disk 2 formed with an outwardly extending peripheral flange 3. The central portion of the base 2 is upset as shown to form a boss 4 having a central opening 5 formed therein. Both sides of the boss are provided with resilient washers or gaskets 6 and 7 which surround the opening 5 as shown. Secured to the body portion 1 of the vehicle by means of a screw and lock washer 8 and 9, respectively, is an externally threaded shaft 10 formed at one of its ends with a flange 11 which is drawn securely against the body portion 1 by the screw 8 and which forms a seat for the gasket 6. Removably secured to the shaft 10 is an internally bored and threaded end portion 12 of a hub 13 whose opposite end is formed integral with a cup-shaped or semi-spherical container 14 whose rim is provided with an inverted U-shaped gasket 15 adapted to be forced within and against the flange 3 of the base 2 by advancing the threaded portion 12 of the hub 13 on the threads of the shaft 10.

The container 14 and the hub 13 are made of readily breakable transparent material such as glass or the like and the container is filled with a transparent liquid 16 such as colored dye, colored transparent paint or the like. The surface of the base 2 which is viewed through the container may be highly polished to serve as a reflector light or I may choose to insert a separate mirror or reflecting disk to reflect light from the lights of an approaching vehicle. With either form of reflector the reflected light will be magnified through the liquid contained in the container 14.

Figure 3:
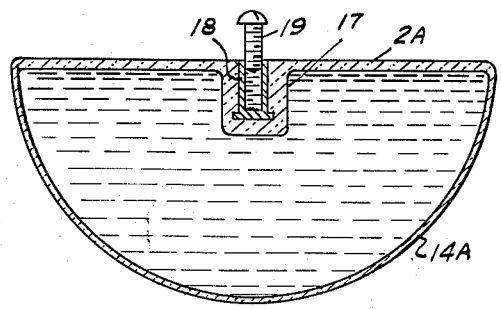
Figure 3 is a view similar to Figure 2 illustrating a modified form of the invention.

In the modified form of the invention shown in Figure 3, the base 2A and the container 14A may be molded as an integral unit, the center of the base being formed with an inwardly extending molded hub 17 having an internally threaded and flanged bushing 18 embedded therein to receive a screw 19 by means of which the base and container may be secured to the body of the vehicle as aforesaid. The container 14A may be filled with dye or paint as aforesaid and plugged or sealed in its process of manufacture.

While I have shown a particular form of embodiment of my invention, I am aware that many minor changes therein will readily suggest themselves to others skilled in the art without departing from the spirit and scope of the invention.

Having thus described my invention, what I claim as new and desire to protect by Letters Patent is:

An article of the class described comprising in combination a container of semi-spherical formation in cross section, a base of transparent material molded integrally with the rim of said container, a colored fluid contained within the container, a hub molded integrally with said base and extending into the container, and a fastening element threaded into said hub for securing the article to a support.

LOYAL VERN WILSON.

References Cited in the file of this patent

UNITED STATES PATENTS

| Number | Name | Date |
|---|---|---|
| 2,042,689 | Wallace | June 2, 1936 |
| 2,468,829 | La Porta | May 3, 1949 |
| 2,572,940 | Lockhart | Oct. 30, 1951 |

FOREIGN PATENTS

| Number | Country | Date |
|---|---|---|
| 597,173 | Germany | May 18, 1934 |